United States Patent [19]

Tappe et al.

[11] 4,440,681
[45] Apr. 3, 1984

[54] WATER-INSOLUBLE MONOAZO DYESTUFFS AND THEIR PREPARATION

[75] Inventors: Horst Tappe, Dietzenbach; Rudolf Löwenfeld, Dreieich; Uwe Kosubek, Büttelborn; Maria Kallay, Königstein, all of Fed. Rep. of Germany

[73] Assignee: Cassella Aktiengesellschaft, Frankfurt am Main, Fed. Rep. of Germany

[21] Appl. No.: 257,360

[22] Filed: Apr. 24, 1981

[30] Foreign Application Priority Data

Apr. 28, 1980 [DE] Fed. Rep. of Germany ....... 3016301

[51] Int. Cl.³ ............................................. C09B 29/08
[52] U.S. Cl. .................................. 260/207.1; 260/152; 260/158; 260/187; 8/687; 8/691; 8/696
[58] Field of Search ............ 260/152, 158, 187, 207.1

[56] References Cited

U.S. PATENT DOCUMENTS

| | | | |
|---|---|---|---|
| 3,932,377 | 1/1976 | Merlo et al. | 260/158 |
| 4,007,213 | 2/1977 | Schickfluss | 260/207.1 X |
| 4,062,642 | 12/1977 | Deucker et al. | |
| 4,082,740 | 4/1978 | Mohr et al. | 260/207.1 X |
| 4,341,700 | 7/1982 | Matzinger | |

FOREIGN PATENT DOCUMENTS

| | | |
|---|---|---|
| 2707711 | 8/1978 | Fed. Rep. of Germany . |
| 2313495 | 12/1976 | France . |
| 2414064 | 8/1979 | France . |
| 2028383 | 3/1980 | United Kingdom . |
| 2041391 | 9/1980 | United Kingdom . |

Primary Examiner—Thomas A. Waltz
Attorney, Agent, or Firm—Connolly and Hutz

[57] ABSTRACT

Water-insoluble azo dyestuffs, their manufacture and use, which have the formula

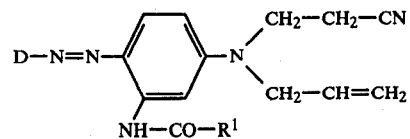

wherein D is a substituted phenyl or heterocyclic moiety which are free from ionic substituents and $R^1$ is methyl or ethyl.

2 Claims, No Drawings

WATER-INSOLUBLE MONOAZO DYESTUFFS AND THEIR PREPARATION

The present invention relates to new, water-insoluble azo dyestuffs of the general formula I

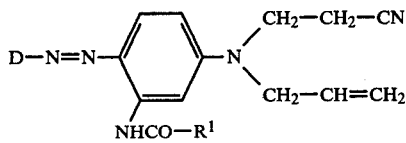

in which D denotes the radical of a diazo component of the benzene or heterocyclic series which is free from ionic groups and $R^1$ denotes methyl or ethyl, to their manufacture by diazotisation and coupling in a manner which is in itself known and to their use for dyeing and printing synthetic, hydrophobic fibre materials.

French Patent Specification No. 1,382,654 discloses dyestuffs of the general formula

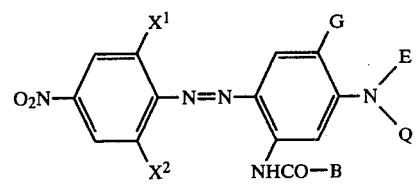

wherein $X^1$ denotes cyano, nitro, trifluoromethyl or alkylsulphonyl, $X^2$ denotes hydrogen, chlorine or bromine, B denotes optionally substituted lower alkyl, G denotes optionally substituted alkyl or alkoxy and E and Q denote lower alkyl and wherein the alkyl radicals can also be unsaturated and/or branched. German Auslegeschrift No. 1,164,971 discloses dyestuffs of the formula

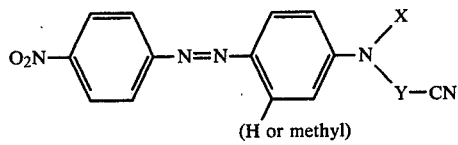

wherein X denotes alkyl which is optionally substituted by —OH and Y denotes straight-chain alkylene.

However, these known dyestuffs do not entirely meet the requirements of industry; in particular, their tinctorial strength and fastness to light still leave something to be desired.

It has now been found that the disadvantages of the known dyestuffs can be overcome by means of new azo dyestuffs of the formula I

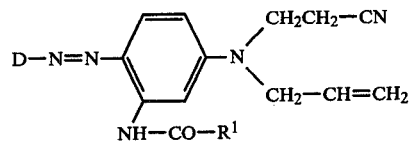

wherein D and $R^1$ have the abovementioned meanings.

If D is the radical of a diazo component of the benzene series which is free from ionic groups, it denotes a phenyl radical which carries at least one substituent of the series halogen, particularly fluorine, chlorine or bromine, nitro, methyl, trifluoromethyl, alkylsulphonyl, particularly alkylsulphonyl having 1 to 4 C atoms, phenylazo or carboxylic acid amide or sulphonamide, each of which is optionally N-monosubstituted or N,N-disubstituted, suitable substituents being alkyl radicals having 1 to 4 C atoms.

Although the phenyl nucleus represented by D can, in principle, contain up to 5 substituents, in the dyestuffs according to the invention it usually carries not more than three. These substituents are preferably in the 2-, 4- and/or 5- or 6-positions of the phenyl radical, relative to the azo bridge.

Amongst the dyestuffs according to the invention in which D is derived from the diazo component of the benzene series, preferred dyestuffs are those in which D is the phenyl radical which is substituted by 1 to 3 substituents belonging to the group comprising fluorine, chlorine, bromine, nitro, cyano, trifluoromethyl and methylsulphonyl.

Dyestuffs according to the invention which are particularly preferred are those of the formula II

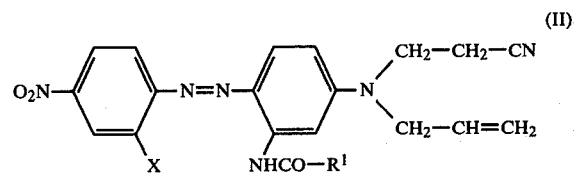

wherein X denotes hydrogen, chlorine, bromine, cyano or nitro, and also the dyestuff of the formula III

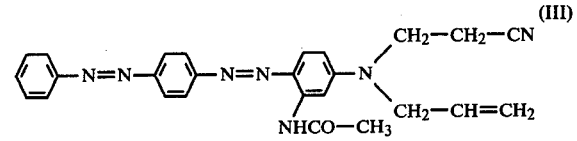

If D is the radical of a heterocyclic diazo component, it denotes an optionally fused radical of the thiophen, thiazole, isothiazole and thiadiazole series, particularly a thiazole, isothiazole, benzthiazole, thiadiazole, benzisothiazole or thiophen radical which is unsubstituted or is substituted by halogen, cyano, nitro, trifluoromethyl, alkyl, particularly alkyl having 1 to 6 C atoms, phenyl, alkoxy or alkylmercapto, particularly alkoxy or alkylmercapto having 1 to 6 C atoms, alkoxycarbonyl, particularly alkoxycarbonyl having 2 to 7 C atoms, carboxylic acid amide which is optionally N-monosubstituted or N,N-disubstituted, suitable substituents being, in particular, alkyl radicals having 1 to 4 C atoms, or alkylsulphonyl, particularly alkylsulphonyl having 1 to 4 C atoms, it being possible for the phenyl radical to be substituted by halogen, particularly chlorine and bromine, cyano, nitro, trifluoromethyl, alkyl, particularly alkyl having 1 to 4 C atoms, hydroxyl, alkoxy, particularly alkoxy having 1 to 4 C atoms, or alkoxycarbonyl, particularly alkoxycarbonyl having 2 to 5 C atoms.

Preferred substituents of the heterocyclic radicals represented by D are fluorine, chlorine, bromine, cyano, nitro and methylsulphonyl. Particularly preferred dyestuffs, according to the invention, in which D is the radical of a heterocyclic diazo component, correspond to the formulae IV and V

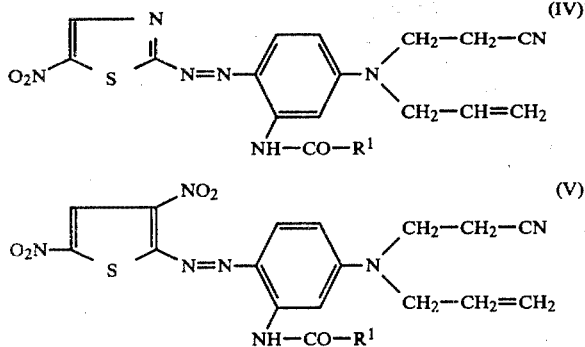

Dyestuffs of the formula I in which $R^1$ is methyl are also preferred. Dyestuffs, according to the invention, which contain several preferred characteristics are also particularly preferred.

The azo dyestuffs according to the invention are obtained by diazotising amines of the general formula VI D—$NH_2$ (VI) wherein D has the meaning indicated above, and coupling the product with coupling components of the general formula VII

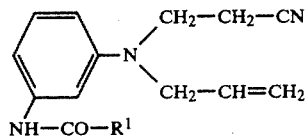

wherein $R^1$ is methyl or ethyl.

The diazotisation of the amine of the formula VI is effect in a manner which is in itself known by the action of nitrous acid or compounds which split off nitrous acid.

For example, the aminoazobenzenes can be dissolved in sulphuric acid or hydrochloric acid or in lower aliphatic carboxylic acids, such as, for example, acetic acid or propionic acid, and can be diazotised at 0° to 60° C. by adding nitrosylsulphuric acid or sodium nitrite. The coupling is carried out in an aqueous medium in the presence of a mineral acid, such as hydrochloric acid or sulphuric acid or a strong organic acid, such as formic acid, acetic acid or propionic acid, or in a mixture composed of water and an alcohol sparingly soluble in water, such as n-butanol or i-butanol, at temperatures from 0° to 30° C. The temperature range from 0° to 5° C. is preferred in this connection. In order to complete the coupling reaction, it can be appropriate to buffer the pH value of the coupling mixture at a value of 3 to 6 towards the end of the reaction by adding alkalis, such as, for example, sodium acetate. It can be advantageous, with regard to the formation of the disperse dyestuffs or with a view to their dyestuff yield, to couple a mixture of diazotised amines of the formula VI with a coupling component of the formula VII or to couple a diazotised amine of the formula VI with a mixture of coupling components of the general formula VII or to mix two or more single dyestuffs prepared by separate routes.

Examples of suitable amines of the formula VI are p-nitroaniline, 2-chloro-4-nitroaniline, 2-bromo-4-nitroaniline, 2-methylsulphonyl-4-nitroaniline, 2-trifluoromethyl-4-nitroaniline, 2,4-dinitroaniline, 2-cyano-4-nitroaniline, 2,4-dinitrochloroaniline, 2,4-dinitrobromoaniline, 2,4-dinitro-6-cyanoaniline, 2,6-dicyano-4-nitroaniline, 2-cyano-4-nitro-6-bromoaniline, p-aminoazobenzene, 5-nitrobenzthiazole, 3,5-dinitrothiophene, 2-amino-6-nitrobenzthiazole and 2-amino-4-nitrobenzisothiazole.

The coupling components of the formula VII can be obtained by processes which are in themselves known from amines of the formula VIII

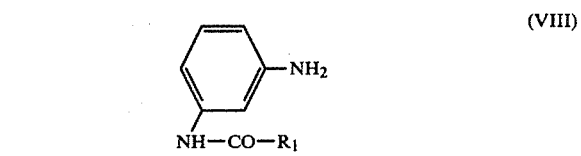

by reacting the latter with acrylontrile and reacting the product further with allyl halides, preferably allyl chloride, in the presence of an acid-binding agent.

The dyestuffs, according to the invention, of the general formula I are excellently suitable for dyeing and printing synthetic, hydrophobic fibre materials and mixtures of these fibre materials with cellulose fibres or wool. Preferred hydrophobic fibre materials are those made from aromatic polyesters, cellulose esters and polyamides, particularly polyesters. The dyestuffs according to the invention can also be employed particularly advantageously in the form of a mixture.

The deep dyeings obtained in accordance with the invention are distinguished by clarity and good general fastness properties, and polyester dyeings, for example, being distinguished by good fastness to light, build-up, stability to reduction, fastness to thermofixing and pH stability.

Compared with the nearest comparable known dyestuffs of German Auslegeschrift No. 1,164,971 or French Patent No. 1,382,654, the dyestuffs according to the invention have, in particular, the advantage of higher tinctorial strength and fastness to light.

The dyestuffs according to the invention are also suitable for polyester-wool mixtures, and also exhibit good fastness properties when washed at 95° C., to peroxides, to acid perspiration and, particularly, to alkaline perspiration, to oxides of nitrogen and to exhaust gases, and they have good fasteness of hypochlorite bleach and fastness to rubbing and to koratron treatment.

The said fibre material is appropriately dyed with the dyestuffs according to the invention from an aqueous suspension, at between about 80° and 100° C. in the presence of carriers, at between 100° and 140° C. in the absence of carriers and also at about 180°–230° C. using the so-called thermofixing process. Polyester-wool mixtures are dyed in the presence of carriers at the boil or under pressure at 105° C.

The said materials can be printed by steaming the goods which have been printed with the new dyestuffs at temperatures between about 80° and 110° C. in the presence of a carrier or at about 110° C. to 180° C. in the absence of a carrier or by treating the goods by the so-called thermofixing process at about 180°–230° C.

The dyestuffs according to the invention are also suitable for dyeing the hydrophobic materials listed above from organic solvents or for mass coloration.

EXAMPLE 1

(a) 17.3 parts of 2-chloro-4-nitroaniline in 150 parts of acetic acid are diazotised at 15°–20° C. with 32.6 parts of 42% strength nitrosylsulphuric acid and the diazo solution is added, at 0°–5° C. and while stirring, to a mixture of 200 parts of isobutanol, 50 g of ice and 24.2 parts of N-acetyl-N'-cyanoethyl-N'-allyl-m-phenylenediamine, 30 g of ice being added during the coupling reaction. The mixture is stirred for a further 2 hours, a solution of 49 parts of sodium acetate in 150 parts of water is then added, stirring is continued for a further 3 hours and the mixture is poured into 500 parts of water. Filtration, washing and drying gives 40.6 parts of dyestuff powder.

(b) 1.0 part of the dyestuff of the formula

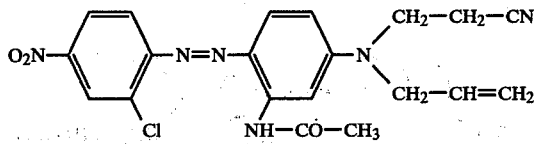

thus obtained is stirred, in a finely divided state, into 2,000 parts of water. The pH is adjusted to a value of 5 with acetic acid and 4.0 parts by weight of ammonium sulphate and 2.0 parts of a naphthalenesulphonic acid/-formaldehyde condensation product are added.

100 parts of a polyester fabric based on polyethylene glycol terephthalate are introduced into the dye liquor thus obtained and dyeing is carried out for 1 hour at 130° C.

After subsequent rinsing and drying, a clear, deep red dyeing which has very good coloristic properties, particularly very good fastness to light and thermofixing, is obtained.

EXAMPLE 2

(a) 16.3 parts of 2-cyano-4-nitroaniline are diazotised as described in Example 1(a) and the product is coupled with 25.7 parts of N-propionyl-N'-cyanoethyl-N'-allyl-m-phenylenediamine and the coupling product is isolated.

(b) 30.0 parts of the dyestuff of the formula

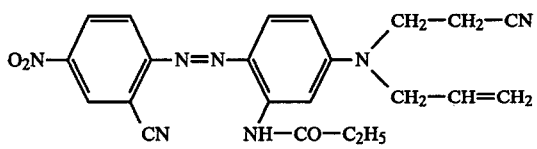

which has been obtained as specified in Example 2(a) are incorporated, in a fine state of division, into a printing paste containing, per 1,000 parts by weight, 45.0 parts by weight of locust bean flour, 6.0 parts by weight of sodium 3-nitrobenzenesulphonate and 3.0 parts by weight of citric acid. Using this printing paste, a deep, ruby-coloured print which has very good coloristic properties, particularly very good fastness to light and pleating by dry heat and fixing by dry heat, is obtained, as described in Example 1b, on a polyester fabric after printing, drying and fixing in a thermofixing frame for 45 seconds at 215° C., and rinsing and finishing. A ruby-coloured print which has very good coloristic properties is obtained when the dyestuff is used to print triacetate fabric, if the dyestuff is employed in the form of the above printing paste and if, after drying, the printed fabric is steamed for 10 minutes at 1.5 atmospheres gauge, rinsed, soaped, rinsed again and dried.

EXAMPLE 3

(a) 13.8 parts of 4-nitroaniline are diazotised as indicated in Example 1(a) and the product is coupled with N-acetyl-N'-cyanoethyl-N'-allyl-m-phenylenediamine and the resulting dyestuff is isolated.

(b) A fabric made of polyethylene glycol terephthalate is padded at 30° C. on a paddar with a liquor containing 30 parts by weight of the dyestuff of the formula

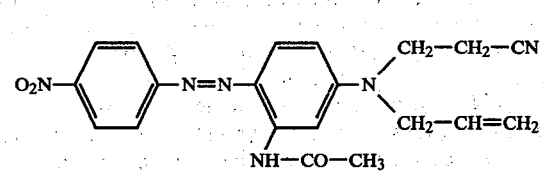

which has been obtained as specified in Example 3(a) and is applied in a fine state of division, 1.0 part by weight of polyacrylamide having a K-value of 120 and 0.5 part by weight of a polyglycol ether of oleyl alcohol and 968.5 parts by weight of water. After drying, fixing is carried out for 60 seconds at 215° C. in a thermofixing frame. After subsequent rinsing and finishing as described in Example 1(b), a brillant scarlet dyeing which has very good fastness properties, particularly very good fastness to light, is obtained.

EXAMPLE 4

(a) 19.7 parts of p-aminoazobenzene are diazotised as indicated in Example 1(a) and the product is coupled with N-propionyl-N'-cyanoethyl-N'-allyl-m-phenylenediamine and the dyestuff of the following formula is isolated.

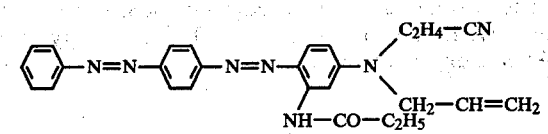

(b) 100 parts by weight of polyester material are treated for 30 minutes, at 121° C., in 1,500 parts by weight of tetrachloroethylene in which 2.0 parts by weight of the dyestuff described in Example 4(a) have been dissolved. Rinsing with warm and cold tetrachloroethylene gives a strong scarlet-red dyeing which has very good coloristic properties. Scarlet-red dyeings which have very good coloristic properties are also obtained if, in the above example, the polyester material is replaced by 100 parts by weight of triacetate or 2½-acetate material and if dyeing is carried out for 45 minutes at 110° C. or for 45 minutes at 80° C.

EXAMPLE 5

(a) 18.3 parts of 2,4-dinitroaniline are diazotised as described in Example 1(a) and the product is coupled with N-acetyl-N'-cyanoethyl-N'-allyl-m-phenylenediamine. This gives the dyestuff of the formula

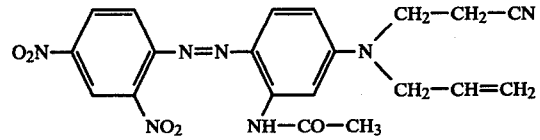

(b) Under the conditions of the printing instructions quoted in Example 2(b), 30.0 parts by weight of the dyestuff described in Example 5(a), which is applied in a fine state of division, produce a ruby-colored print which has very good coloristic properties, particularly very good fastness to light and thermofixing.

EXAMPLE 6

(a) A solution of 0.2 mol of diazotised 2-amino-5-nitrothiazole in a mixture of sulphuric acid, acetic acid and propionic acid (obtained in accordance with the instructions of Example 1 of German Auslegeschrift No. 1,019,415) is added, at 0° to +5° C., in the course of 10 minutes, to a solution of 48.8 g of N-acetyl-N'-cyanoethyl-N'-allyl-m-phenylenediamine in 320 parts of isobutanol. After stirring for a further 2 hours, the mixture is made up to 3,000 parts with ice water and the dyestuff is filtered off, washed until neutral and dried.

(b) 30 parts of the dyestuff of the formula

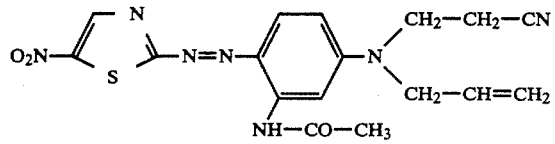

are added, in a fine state of division, to a padding liquor containing, per 1,000 parts, 937 parts of water, 3 parts of monosodium phosphate, 10 parts of sodium chlorate and 20 parts of a polymerisation product based on acrylic acid, as an antimigration agent. This padding liquor is used to pad a polyester fabric. After drying of the fabric, over-printing is carried out using a printing paste containing, per 1,000 parts, 600 parts of a 10% strength aqueous locust bean flour ether thickener, 120 parts of water, 80 parts of sodium carbonate, 100 parts of polyethylene glycol 400 and 100 parts of glycerol. After fixing with superheated steam for 7 minutes at 175° C., reductive aftertreatment, soaping and subsequent rinsing and drying a reddishtinged blue print which has very good fastness properties, above all good fastness to light, fixing by dry heat, rubbing and washing, is obtained. A very good white ground having sharp outlines is obtained on the areas which are printed with the printing paste containing sodium carbonate.

EXAMPLE 7

19.5 parts of 2-amino-6-nitrobenzthiazole are diazotised as in Japanese Patent Application No. 74,117,522 (CA 83, 12,116 (1975)) and the product is coupled as in Example 1(b). This gives a dyestuff of the formula

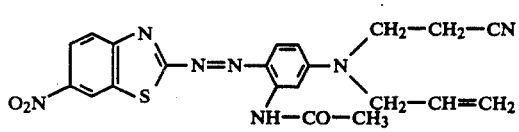

If the procedure followed is in other respects as indicated in Example 1(b), a ruby-coloured dyeing which has good coloristic properties, particularly good fastness to thermofixing, is obtained.

What is claimed is:

1. Water-insoluble azo dyestuffs of the formula

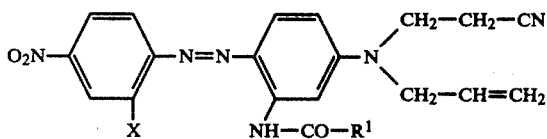

wherein X is hydrogen, chloro, bromo, cyano or nitro and $R^1$ is methyl or ethyl.

2. Water-insoluble azo dyestuffs according to claim 1 wherein $R^1$ is methyl.

* * * * *